United States Patent
Downey

[11] 3,888,093
[45] June 10, 1975

[54] FLEXIBLE SHAFT COUPLING

[75] Inventor: Holmes A. Downey, Bremen, Ind.

[73] Assignee: Reliance Electric Company, Mishawaka, Ind.

[22] Filed: Feb. 21, 1974

[21] Appl. No.: 444,277

[52] U.S. Cl. ................................. 64/13; 64/11 R
[51] Int. Cl. ........................................... F16d 3/78
[58] Field of Search ....... 64/13, 11 R, 27 NM, 27 R

[56] References Cited
UNITED STATES PATENTS

| | | | |
|---|---|---|---|
| 1,676,676 | 7/1928 | Weiland | 64/11 R |
| 3,364,698 | 1/1968 | Firth | 64/11 R |
| 3,626,767 | 12/1971 | Wildi | 64/13 |

Primary Examiner—Benjamin W. Wyche
Assistant Examiner—Randall Heald
Attorney, Agent, or Firm—Marmaduke Hobbs; Hobbs & Green

[57] ABSTRACT

A flexible coupling for connecting two shafts in end-to-end relation in which spaced flanges for mounting the coupling on the shafts include an annular radial portion with pins mounted on the internal surface and a flexible torsional element disposed between the two flanges and embracing the pins. The flexible element of rubber or rubber-like material has spaced, inwardly extending side walls in which the holes for receiving the pins are disposed, and the element is preferably of a U-shaped cross sectional configuration. An axial and radial slit is provided in the element to permit it to be opened up for installation and removal without displacing the flanges.

8 Claims, 6 Drawing Figures

PATENTED JUN 10 1975 3,888,093

SHEET 3

FLEXIBLE SHAFT COUPLING

One type of flexible shaft coupling for connecting two shafts in end-to-end relation consists of two flanges mounted on and secured to the ends of the two shafts and a flexible element of generally U-shaped cross section clamped at the edges to the two flanges, normally using rings which are bolted or otherwise secured to the flanges and firmly holding the element in place between the flanges. The element is normally split crosswise at one place to permit the element to be spread apart and quickly assembled on the flanges; however, the clamping operation utilizing a number of bolts or screws in each flange is time consuming and involves considerable down time of the machine or equipment. The type of element used in the coupling is particularly effective in transmitting torque between shafts involving most types of misalignments without significant loss in power. Another common type of shaft coupling, often referred to as a pin type coupling, consists of a flange for each of the shafts in end-to-end relation, each flange having a plurality of pins projecting alternately toward the other flange and a generally disc-shaped element of limited flexibility disposed between the shaft flanges and containing holes into which the pins of the two shafts alternately extend. One of the principal disadvantages of this type of pin type coupling is that at least one of the shaft flanges must be displaced on the shaft, and possibly parts of the machine or equipment moved, in order to replace a worn element. This operation is not only time consuming, but reassembling the parts in proper alignment is often difficult. It is therefore one of the principal objects of the present invention to provide a pin type coupling in which the element can be replaced without displacing the shaft flanges, and which utilizes a flexible element of generally U-shaped cross section without clamping the element to the flanges.

Another object of the invention is to provide a flexible coupling in which a torsional element of U-shaped configuration in cross section is connected to shaft flanges by alternate pins disposed in a circular relationship on the flanges, and in which the element can be easily assembled on the pins by merely seating the pins in holes in the spaced flanges of the element.

Still another object of the invention is to provide a shaft coupling of the aforesaid type which can be readily assembled onto the shafts and the flanges thereof precisely aligned and secured in place before the torsional element interconnecting the flanges is installed, and which is so constructed and designed that it will give long, trouble-free service.

Another object of the invention is to provide a torsional element for shaft couplings, which is of a generally U-shaped configuration in cross section with inwardly extending, laterally spaced side walls in which holes are provided for receiving mounting pins as the sole or principal means connecting the element to the shaft flanges, and which is separated by an axial slit to permit the element to be readily assembled onto the flanges without displacing the shaft flanges.

Additional objects and advantages of the present invention will become apparent from the following description and accompanying drawings, wherein.

Figure 1:
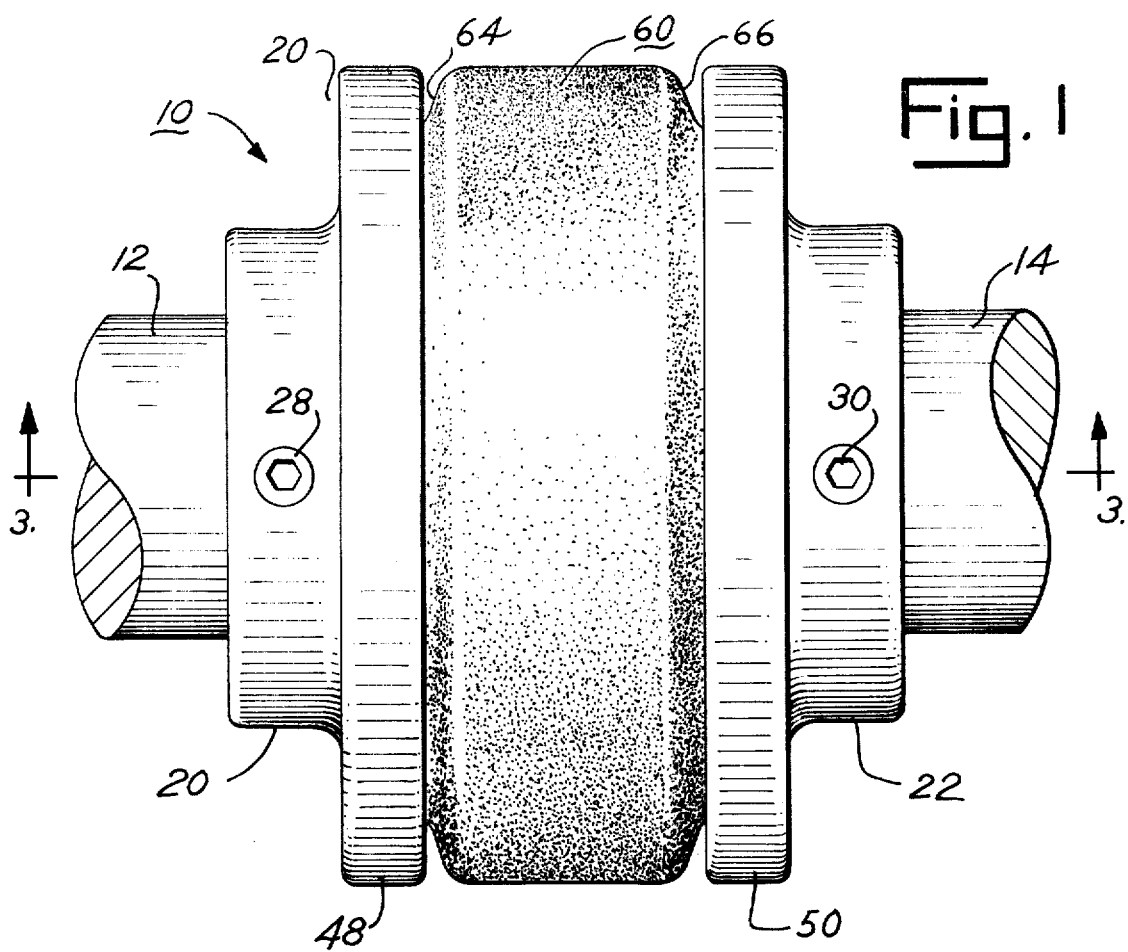
FIG. 1 is an elevational view of a shaft coupling embodying the present invention, showing the coupling mounted on two axially aligned shafts.
Figure 2:
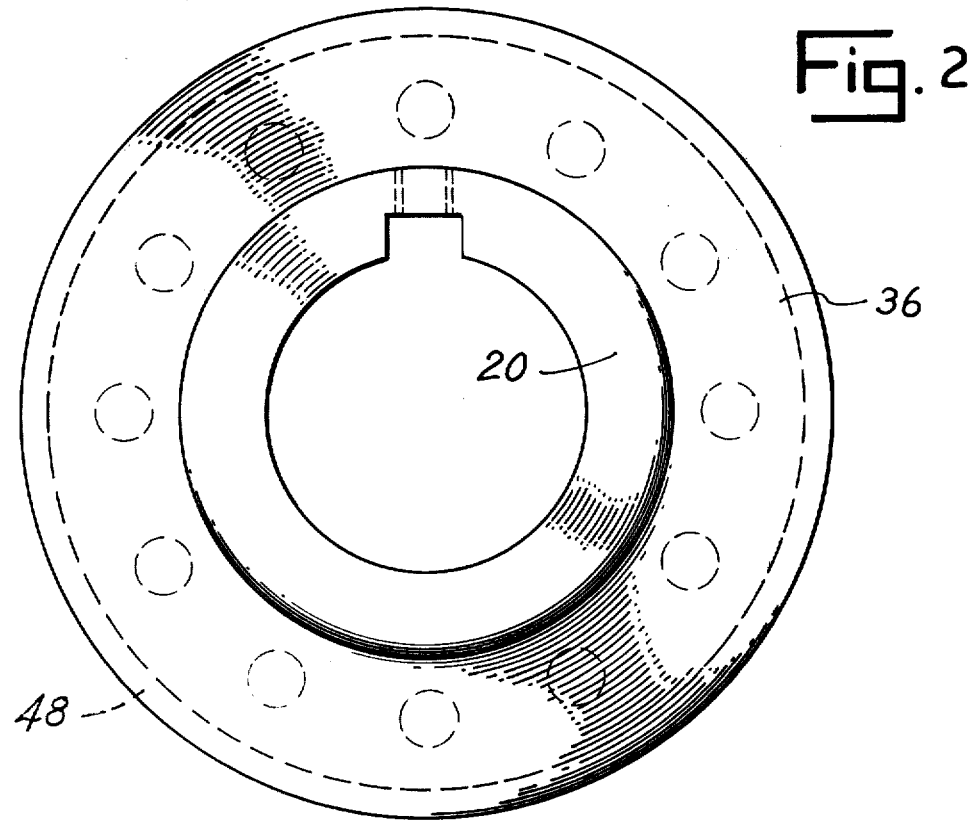
FIG. 2 is an end elevational view of the coupling shown in FIG. 1.

Referring more specifically to the drawings, numeral 10 indicates generally the present coupling mounted on shafts 12 and 14, which are in generally axial alignment with one another and which may be the shaft 12 of a motor, for example, for driving equipment through shaft 14. However, the coupling can be used satisfactorily for connecting shafts of a variety of different machines and equipment.

The coupling consists of two flanges 20 and 22 secured to shafts 12 and 14, respectively, by keys 24 and 26 secured in place by set screws 28 and 30, the set screws extending through laterally extending annular portions 32 and 34 of the two flanges 20 and 22. The two flanges are shown as identical in construction; however, they may be different, particularly with respect to the size of the bores for the shafts and the means for securing the flange to the respective shaft.

The flanges have radial portions 36 and 38 which contain a plurality of axially parallel pins 40 and 42 arranged in an annular configuration on the inner face of the two radial portions. In the embodiment illustrated, each flange contains 12 pins spaced outwardly from hubs 44 and 46, respectively, and preferably being formed integrally with radial portions 36 and 38. Annular peripheral members 48 and 50 are preferably provided on the outer edge of the radial portions to facilitate the alignment of the two flanges and their respective shafts when the coupling is being installed.

The flexible torsional element 60 interconnects the two flanges 20 and 22, and preferably consists of a body 62 and laterally extending side walls 64 and 66. The entire torsional element is preferably constructed of rubber or rubber-like material of a firm but flexible texture. While reinforcing fabric or the like may be used, either in the body or in the side walls and/or in both, the element shown is constructed without the reinforcement. The two flanges 64 and 66 each contain holes 68 and 70, respectively, for receiving pins 40 and 42 of flanges 20 and 22, the size of the holes with respect to the pins preferably being slightly smaller so that an effective gripping action occurs when the element is assembled on the flanges. The element is one piece in construction, and preferably has a slit 72 to facilitate assembly of the element on the two flanges and to permit replacement of the element without displacement of the flanges on the shaft. The element is capable of distortion and sufficiently flexible to permit the side walls to be pressed inwardly to assemble the two walls 64 and 66 on their respective pins 40 and 42.

Figure 3:
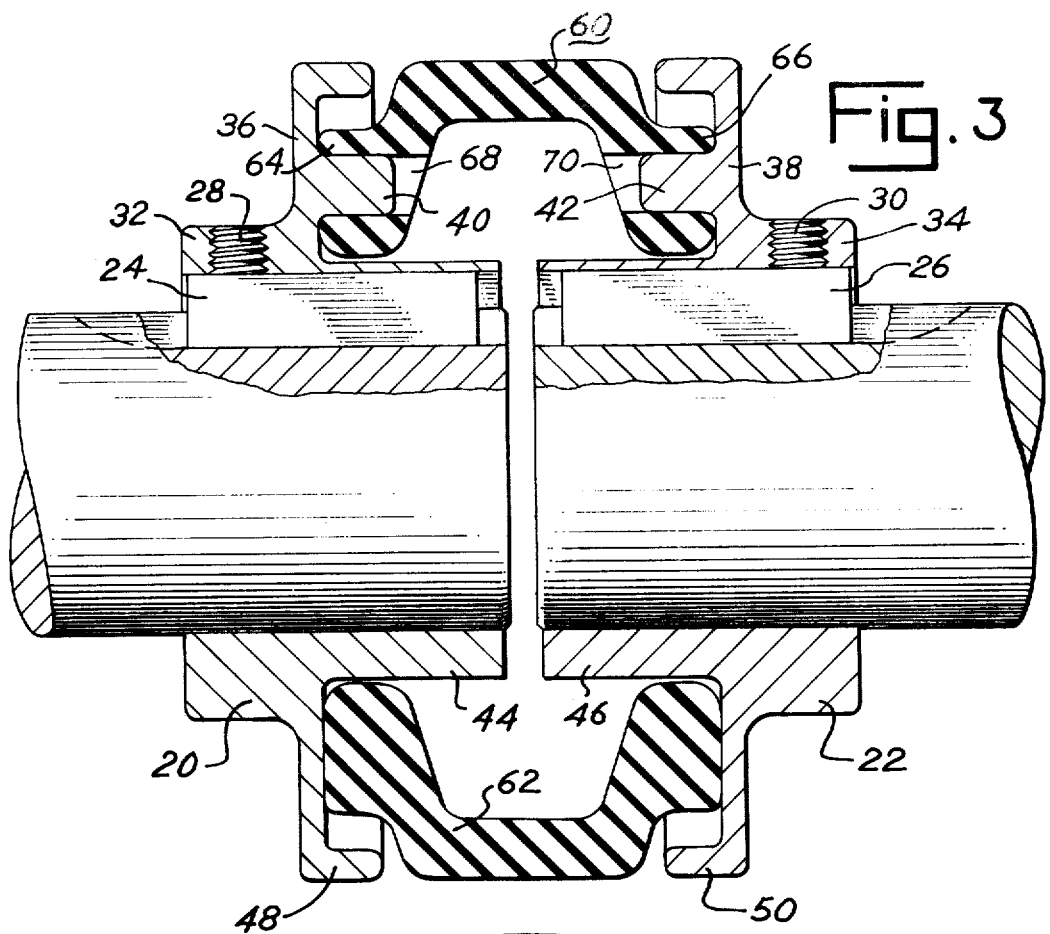
FIG. 3 is an axial cross sectional view, the section being taken on line 3 - 3 of FIG. 1.
Figure 4:
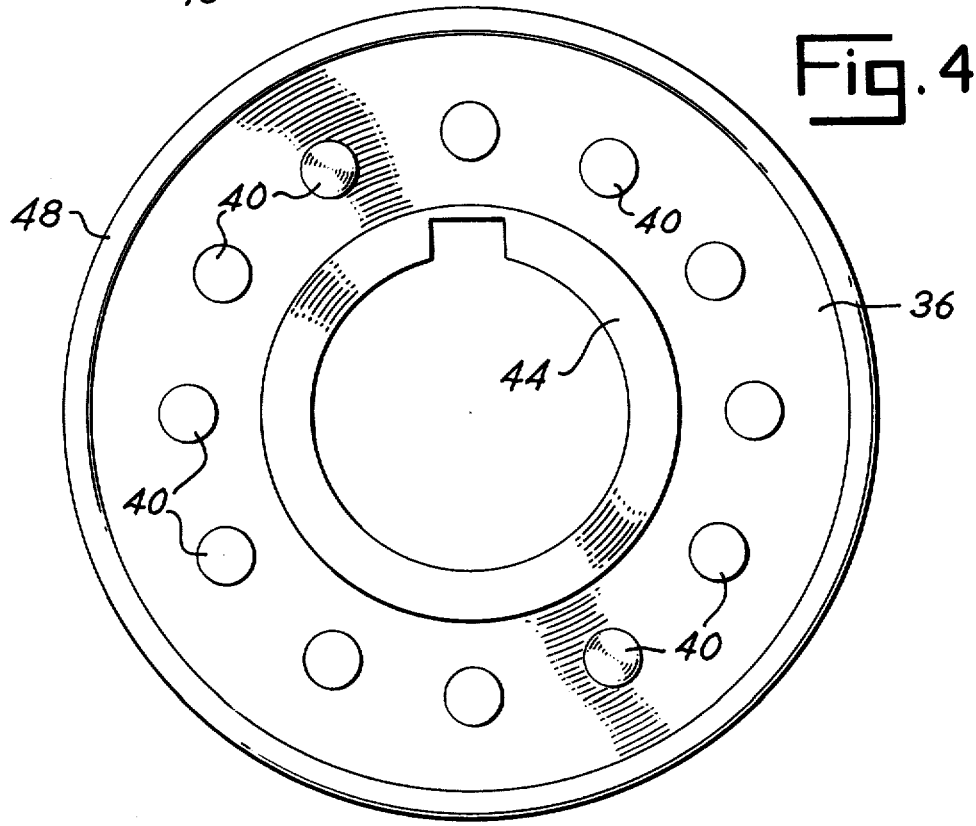
FIG. 4 is an elevational view of one of the flanges showing it removed from the shaft.
Figure 5:
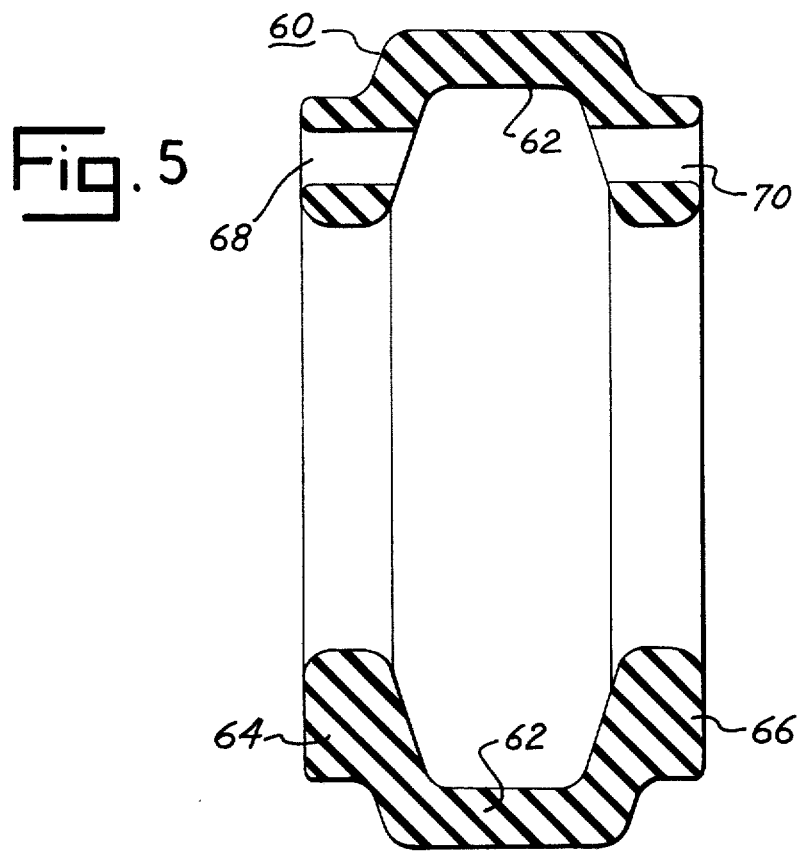
FIG. 5 is an axial cross sectional view of the flexible element with the element removed from the coupling.
Figure 6:
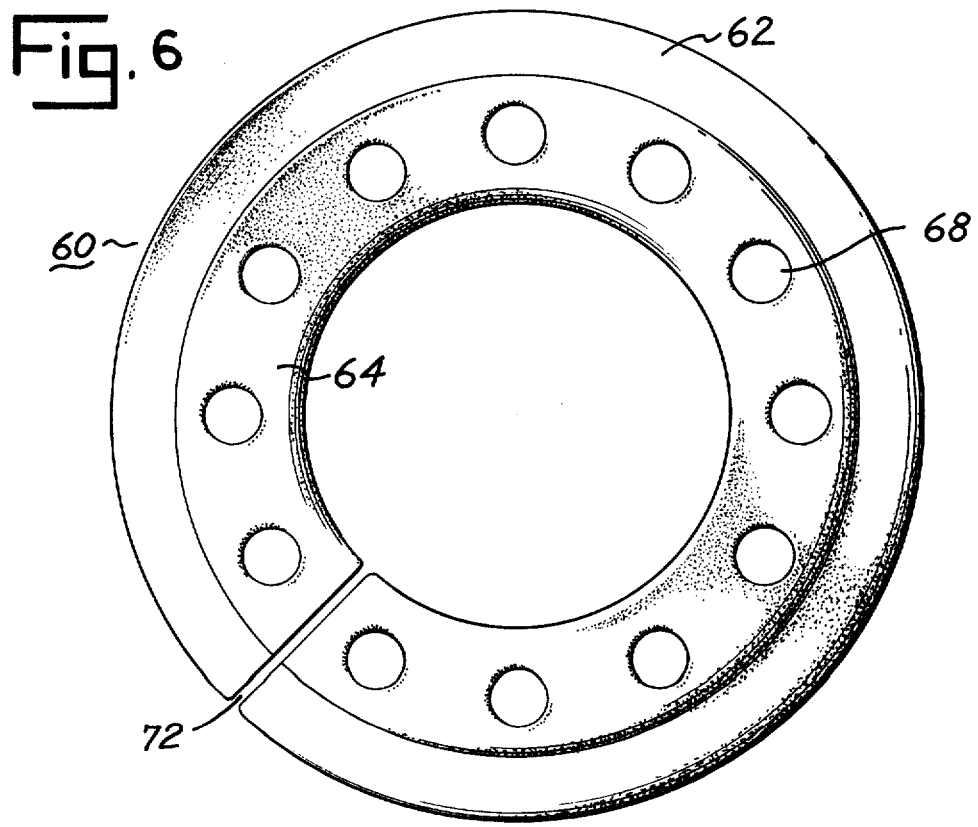
FIG. 6 is a side elevational view of the element shown in the preceding figures.

In the installation and operation of the present flexible shaft coupling, the two flanges 20 and 22 are assembled on their respective shafts 12 and 14, and rigidly secured thereto in proper position by keys 24 and 26 and set screws 28 and 30. The shafts are aligned, using peripheral portions 48 and 50 to assist in the precise positioning of the flanges and shafts. With the two flanges properly assembled on the shafts and the shafts in proper alignment, the flexible torsional element 60 is then assembled in place on and in between the two flanges by spreading apart the ends of the element on either side of slit 72 sufficiently to permit the coupling to slip over the shaft and flanges and then partially close. Either one or both of the walls 64 and 66 are compressed inwardly sufficiently to permit the outer or radial surfaces thereof to pass over pins 40 and 42, and to align the pins with the holes in the walls. Upon releasing the sides, the element side walls embrace pins at holes 68 and 70 as illustrated in FIG. 3. The outer radial edges of the two side walls preferably seat on the inner surfaces of the respective shaft flanges. When the edges 64 and 66 are properly seated on the pins, the edges of the coupling adjacent slit 72 are in close proximity to one another. With the element assembled on the two flanges in the foregoing manner, torque is efficiently transmitted from shaft 12 to shaft 14 and the torsional element effectively accommodates misalignment of the two shafts without any substantial loss of torque therebetween.

In the event the torsional element needs to be replaced, the element can be easily removed from the two shaft flanges by pressing the walls 64 and 66 of the element toward one another to disengage them and unseat them from pins 40 and 42. The element can then be opened up by spreading the two ends adjacent slit 72 sufficiently to permit the element to slip from the shaft and the two flanges. A replacement element can thereafter be readily inserted in place without displacing either one of the two shaft flanges. The element is generally U-shaped in cross sectional configuration; however, this may not be critical.

While only one embodiment of the present flexible shaft coupling has been described in detail herein, various changes and modifications may be made without departing from the scope of the invention.

I claim:

1. A flexible coupling for connecting two shafts in end-to-end relation, comprising a flange for each shaft, each flange having a hub for connection to a shaft, an annular radial portion connected to said hub and having an inner surface facing the opposite flange, a plurality of spaced pins projecting in an axial parallel direction from the inner surface of the radial portion, and a flexible torsional element of a generally U-shaped cross sectional configuration disposed between said flanges and having spaced, inwardly extending side walls, said side walls projecting laterally and having a plurality of holes in the laterally projecting portion for receiving the pins on the respective flange.

2. A flexible coupling for connecting two shafts in end-to-end relation as defined in claim 1, in which said torsional element is constructed of rubber-like material and the sides thereof are compressible inwardly toward one another.

3. A flexible element for connecting two shafts in end-to-end relation as defined in claim 2, in which said element of a generally U-shaped cross sectional configuration has said side walls defining an axial opening therethrough and a slit extends axially and radially through the element to permit the element to be opened up to assemble it on and remove it from the said flanges.

4. A flexible coupling for connecting two shafts in end-to-end relation as defined in claim 1, in which said hub contains an axial bore, and a means for securing said hub to a shaft.

5. A flexible coupling for connecting two shafts in end-to-end relation as defined in claim 1, in which said pins are formed integrally with said radial portion and are spaced radially outwardly from said hub.

6. A flexible coupling for connecting two shafts in end-to-end relation as defined in claim 1, in which an annular peripheral portion is joined to the outer edge of said radial portion and extends axially parallel with the flange.

7. A flexible coupling for connecting two shafts in end-to-end relation as defined in claim 1, in which the two external lateral surfaces of the side walls seat on both of the internal surfaces of said radial portions.

8. A flexible coupling for connecting two shafts in end-to-end relation as defined in claim 7, in which annular peripheral portions are joined to the external edges of said radial portions and extend toward one another to overlap the edge of the respective side walls of said element.

* * * * *